United States Patent
Huber et al.

(10) Patent No.: US 7,291,184 B2
(45) Date of Patent: Nov. 6, 2007

(54) METHOD OF REDUCING THE ORGANIC CARBON CONTENT OF PRODUCTION WASTE WATER IN THE COURSE OF THE PREPARATION OF CONCENTRATED SOLUTIONS OF ANIONIC ORGANIC COMPOUNDS

(75) Inventors: Kurt Huber, Sisseln (CH); Rolf Lucas, Grenzach-Wyhlen (DE); Jacek Malisz, Grenzach-Wyhlen (DE); Ernst Wagner, Rheinfelden (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 587 days.

(21) Appl. No.: 10/494,595

(22) PCT Filed: Oct. 31, 2002

(86) PCT No.: PCT/EP02/12161

§ 371 (c)(1),
(2), (4) Date: May 5, 2004

(87) PCT Pub. No.: WO03/040240

PCT Pub. Date: May 15, 2003

(65) Prior Publication Data

US 2005/0004362 A1    Jan. 6, 2005

(30) Foreign Application Priority Data

Nov. 8, 2001    (EP)    .................................. 01811075

(51) Int. Cl.
*C09B 67/54* (2006.01)
*C09B 67/24* (2006.01)

(52) U.S. Cl. .......................... 8/527; 534/775; 544/113; 544/198; 548/255; 548/257; 549/469; 562/58; 562/60; 562/62; 562/70; 562/73; 562/87

(58) Field of Classification Search ............... 8/527; 534/775; 544/113, 198; 548/255, 257; 549/469; 562/58, 60, 62, 70, 73, 87
See application file for complete search history.

(56) References Cited

U.S. PATENT DOCUMENTS

| 4,689,048 | A | 8/1987 | Förtsch et al. ................. 8/524 |
| 4,851,011 | A | 7/1989 | Lacroix et al. ................. 8/527 |
| 6,241,786 | B1 | 6/2001 | Zarges et al. .................. 8/527 |
| 6,719,906 | B1* | 4/2004 | Malisz et al. ............... 210/639 |
| 6,860,906 | B2* | 3/2005 | Malisz et al. .................. 8/648 |
| 2001/0049851 | A1 | 12/2001 | Zarges et al. .................. 8/527 |

FOREIGN PATENT DOCUMENTS

| EP | 0197006 | | 10/1986 |
| EP | 0287515 | | 10/1988 |
| EP | 0505870 | | 9/1992 |
| EP | 0992547 | | 4/2000 |
| WO | 01/32786 | | 5/2001 |
| WO | WO-01/32786 | * | 5/2001 |
| WO | 01/90257 | | 11/2001 |

OTHER PUBLICATIONS

English language abstract for EP 0505870 (1992).

* cited by examiner

*Primary Examiner*—Fiona T Powers
(74) *Attorney, Agent, or Firm*—Mervin G. Wood

(57) ABSTRACT

The present invention relates to a method of reducing the total organic carbon (TOC) content of waste water in the course of the preparation of concentrated solutions or suspensions of anionic organic compounds, which method comprises increasing the concentration of an aqueous solution or suspension of an anionic organic compound in the form of its free acid or its alkali metal salt, having a salt content of less than 5% of extraneous salt by weight based on the total solution or suspension, by microfiltration, ultrafiltration and/or nanofiltration, a) the membrane pore size being so selected that compounds having molecular weights in the range from 300 to 1000 Daltons or higher are retained, and b) the content of anionic compound in the concentrate being so adjusted to from 10 to 50% by weight that the total organic carbon (TOC) content of the permeate is less than 0.5% by weight, based on the total permeate, and c) optionally, after increasing the concentration of a suspension, dissolving the anionic organic compound by adding a suitable base. The invention relates also to the solutions and suspensions prepared by that means and to the use of such solutions or suspensions in dyeing or optically whitening paper or textile materials.

19 Claims, No Drawings

METHOD OF REDUCING THE ORGANIC CARBON CONTENT OF PRODUCTION WASTE WATER IN THE COURSE OF THE PREPARATION OF CONCENTRATED SOLUTIONS OF ANIONIC ORGANIC COMPOUNDS

The present invention relates to a method of reducing the total organic carbon (TOC) content of production waste water in the course of the preparation of concentrated solutions of anionic organic compounds, to the solutions or suspensions prepared by that means and to their use, anionic organic compounds being understood to be, especially, fluorescent whitening agents and dyes and also intermediates for the preparation thereof.

The production of chemical substances such as, for example, dyes and fluorescent whitening agents gives rise to waste waters that are not biologically degradable or that can be biologically degraded only with difficulty. In the case of the starting materials, in contrast, it is frequently still possible to achieve good biological elimination. There is accordingly a two-fold interest in minimising the amount of product taken up into the waste water stream: on the one hand, to keep the product yield as high as possible and, as a result, to increase the economic viability of the process and, on the other hand, to avoid laborious treatment of the waste water whilst nevertheless achieving a waste water quality that meets statutory outflow conditions, especially with regard to refractory constituents. If the untreated waste water is unable to meet those conditions, laborious purification steps are frequently necessary, for example waste water incineration, wet oxidation, anodic electro-oxidation or chemical oxidation using $H_2O_2$ or ozone. Frequently, additional concentration operations and preliminary de-salting steps are also necessary.

Most of the refractory content of waste water from production of anionic organic compounds usually consists of the end products of the chemical reaction themselves, which is why the main priority must be to ensure that those substances do not pass into the waste water stream.

The standard method for isolating the end products of anionic organic compounds is usually to add large amounts of salt to the reaction solution (salting-out), as a result of which the anionic organic compound is precipitated and can be separated out, for example, using a filter press. The filter cake is rinsed, for example, with demineralised water in order to wash out impurities and excess salt. In the process, further amounts of the desired product pass into solution and accordingly enter the waste water stream, or the fine particles pass through the filter material.

The salt load and the total carbon content of the waste water are considerable in that method and have to be removed again by laborious means as mentioned above, which can scarcely be done economically. In fact, elevated salt concentrations have an adverse effect on biological purification, resulting in an even poorer level of degradation of the organic carbon.

The filter cake, on the other hand, is dried and, using suitable aids, is converted into the desired commercial form, which may be a powder or a solution, especially an aqueous solution.

In recent years, the use of concentrated aqueous solutions, for example of dyes and fluorescent whitening agents, has increased in importance, more specifically because of the advantages of such solutions over the corresponding powder forms. The use of solutions avoids the difficulties associated with dust formation and frees the users from the time-consuming and often difficult task of dissolving the powder in water. The use of concentrated solutions has also been encouraged by the development of continuous processes for dyeing or optically whitening paper because it is advantageous in such processes to introduce the solution directly into the hollander or the processing device in question. Liquid components can be dispensed in measured amounts in production much more simply than solids.

EP-A-992 547 proposes a method of increasing the concentration of dye and whitening agent suspensions by means of microfiltration at a pore size of from 0.05 to 40 µm, wherein de-salting is carried out at the same time. The suspension usually contains 1-25% salt by weight. An improvement in the TOC value of the waste waters is not described.

International Application WO 0190257 A2 likewise describes a method of increasing the concentration of dye and whitening agent suspensions by means of ultrafiltration, which method uses smaller pore sizes. In that case too, the starting material consists of waste waters having a salt content, which are de-salted and concentrated by means of the process. An influence on the TOC value of the waste waters is, likewise, not described therein.

It has now been found, surprisingly, that It is possible to dispense with salting-out of the anionic organic compounds from the reaction mixture if that mixture is subjected to microfiltration, ultrafiltration or nanofiltration. As a result, the salt loads associated with salting-out are absent from the waste water, and the TOC value, especially the refractory carbon content, amounts to only a fraction of that in the case of conventional working-up, as a result of which the waste waters can be directly passed to the biological purification plant. There is no need for problematic waste waters to be collected and subjected to collective working-up, with the result that each production location generally can introduce the resulting waste water directly into the biological purification plant ("end of pipe" solution). In fact, in many cases the product quality is found to be improved.

The present invention relates to a method of reducing the total organic carbon (TOC) content of waste water in the course of the preparation of concentrated solutions or suspensions of anionic organic compounds, which method comprises increasing the concentration of an aqueous solution or suspension of an anionic organic compound in the form of its free acid or its alkali metal salt, having a salt content of less than 5% of extraneous salt by weight based on the total solution or suspension, by microfiltration, ultrafiltration and/or nanofiltration, a) the membrane pore size being so selected that compounds having molecular weights in the range from 300 to 1000 Daltons or higher are retained, and b) the content of anionic compound in the concentrate being so adjusted to from 10 to 50% by weight that the total organic carbon (TOC) content of the permeate is less than 0.5% by weight, based on the total permeate, and c) optionally, after increasing the concentration of a suspension, dissolving the anionic organic compound by adding a suitable base.

A free acid is understood to be a compound containing an $SO_3H$ and/or COOH group; alkali metal salts thereof are the salts with Li, Na or K, especially with Li or Na.

As already mentioned hereinbefore, the solutions or suspensions are free from salts from a salting-out process. Any small amounts of salt present may be present only from the actual synthesis steps.

As anionic organic compound, preference is given to the use of a fluorescent whitening agent, a dye or an intermediate for the preparation thereof. Special preference is given to fluorescent whitening agents.

Preference is given to a method wherein a sulfo- and/or carboxy-group-containing fluorescent whitening agent from one of the following classes is used: bis-triazinylamino-stilbenes, bis-triazolyl-stilbenes, bis-styryl-biphenyls or bis-benzofuranylbiphenyls, bis-benzoxalyl derivatives, bis-benzimidazolyl derivatives, coumarin derivatives or pyrazoline derivatives.

The fluorescent whitening agent contains especially at least 2 sulfo groups.

Special preference is given to fluorescent whitening agents of formula 1, 2, 3, 4 or 5

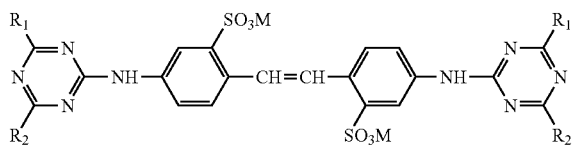

(1)

wherein $R_1$ and $R_2$ are each independently of the other —OH, —Cl, —NH$_2$, O—$C_1$-$C_4$alkyl, —O-aryl, —NH—$C_1$-$C_4$alkyl, —N($C_1$-$C_4$alkyl)$_2$, —N($C_1$-$C_4$alkyl)($C_1$-$C_4$hydroxyalkyl), —N($C_1$-$C_4$hydroxyalkyl)$_2$, —NH-aryl, morpholino or S—$C_1$-$C_4$alkyl(aryl), and aryl is phenyl or naphthyl, each of which may be substituted by 1 or 2 sulfo groups;

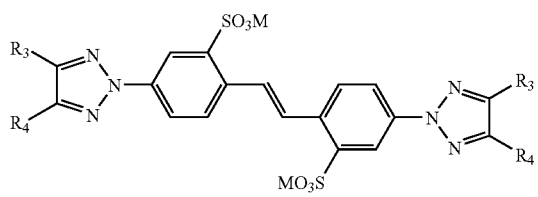

(2)

wherein $R_3$ and $R_4$ are each independently of the other hydrogen, $C_1$-$C_4$alkyl, phenyl or a radical of formula

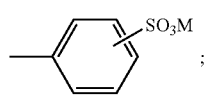
;

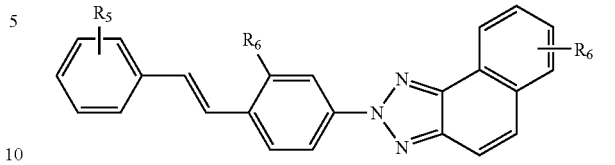

(3)

wherein $R_5$ is hydrogen, Cl or SO$_3$M; and $R_6$ is —CN, —SO$_3$M, —S($C_1$-$C_4$alkyl)$_2$ or S(aryl)$_2$;

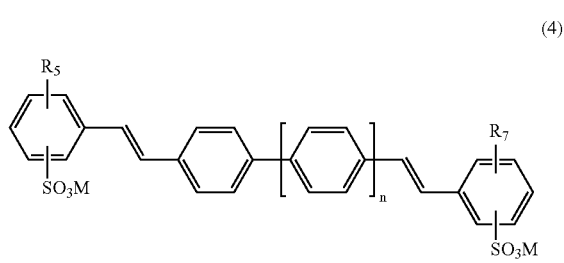

(4)

wherein $R_7$ is hydrogen, —SO$_3$M, —O—$C_1$-$C_4$alkyl, —CN, —Cl, —COO—$C_1$-$C_4$alkyl or CON($C_1$-$C_4$alkyl)$_2$;

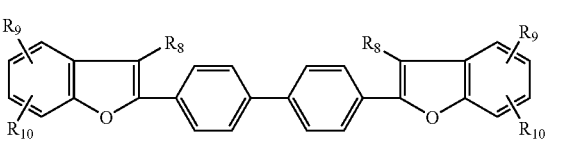

(5)

wherein $R_8$ is hydrogen, —$C_1$-$C_4$alkyl, —Cl or —SO$_3$M; and $R_9$ and $R_{10}$ are each independently of the other hydrogen, $C_1$-$C_4$alkyl, —SO$_3$M, —Cl or —O—$C_1$-$C_4$alkyl;

M is hydrogen, an alkali metal or an ammonium cation, and n is a number 1, 2 or 3.

Specifically preferred fluorescent whitening agents are indicated below.

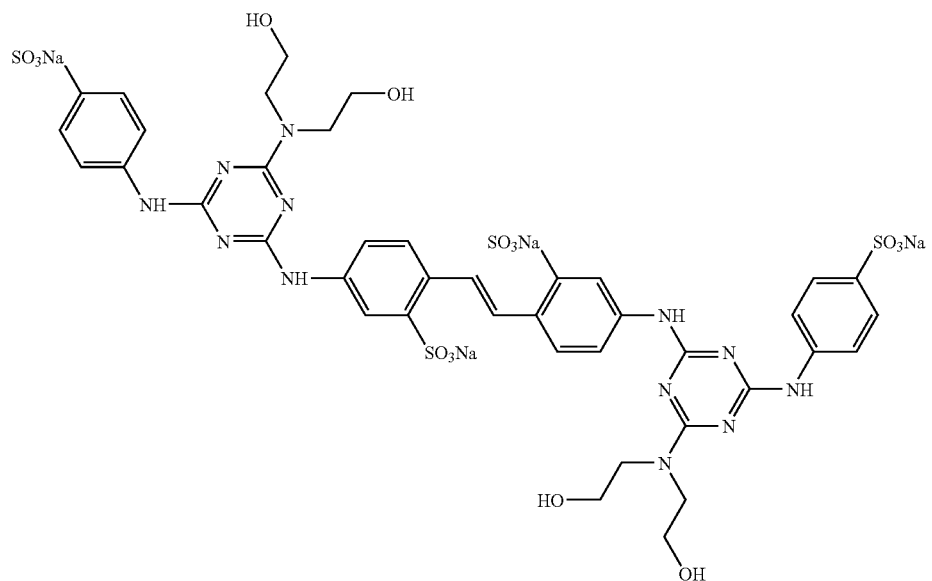
(A)
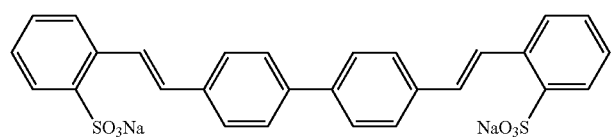
(B)
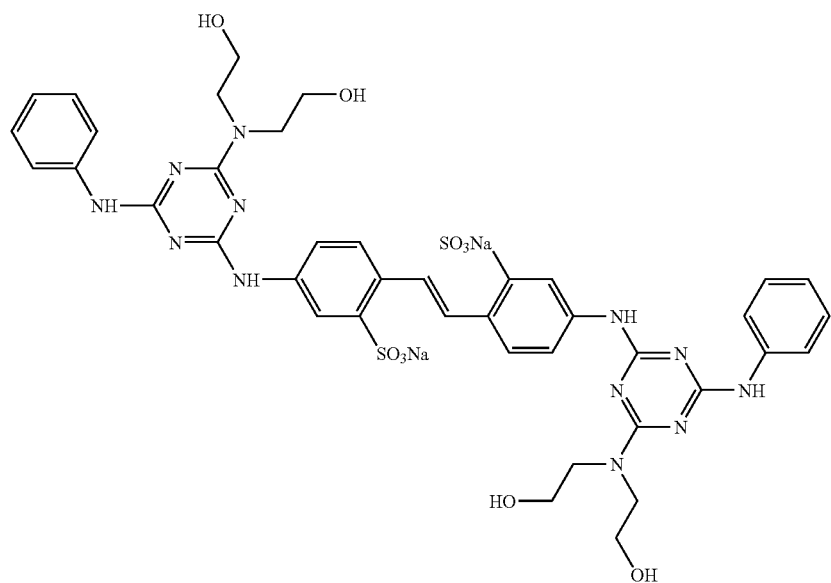
(C)

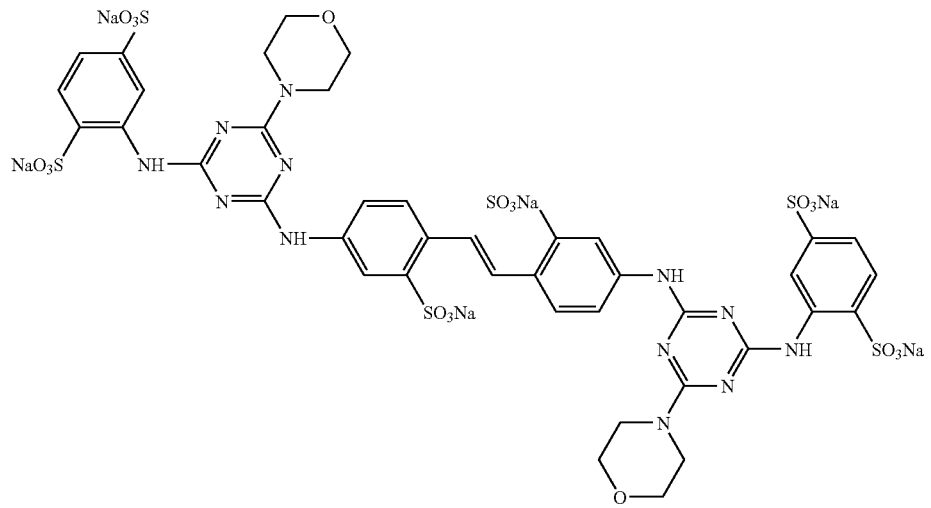

(D)

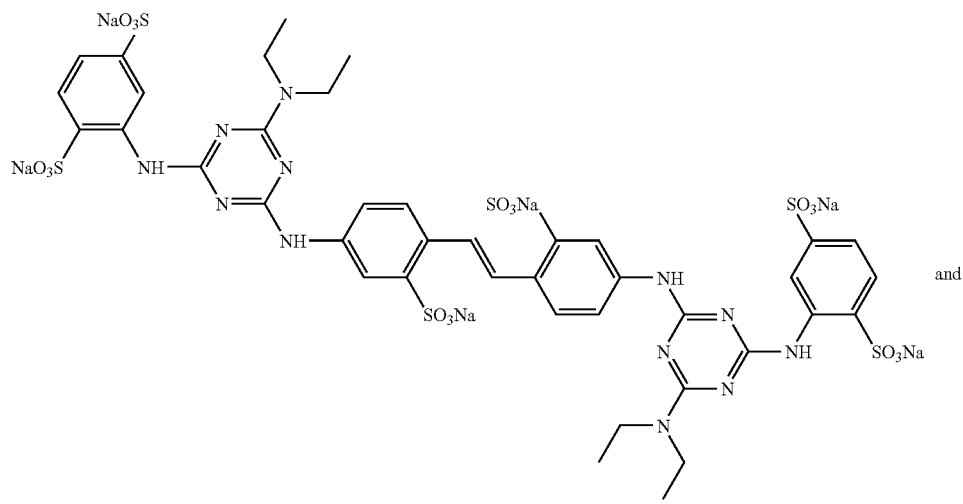

(E)

and

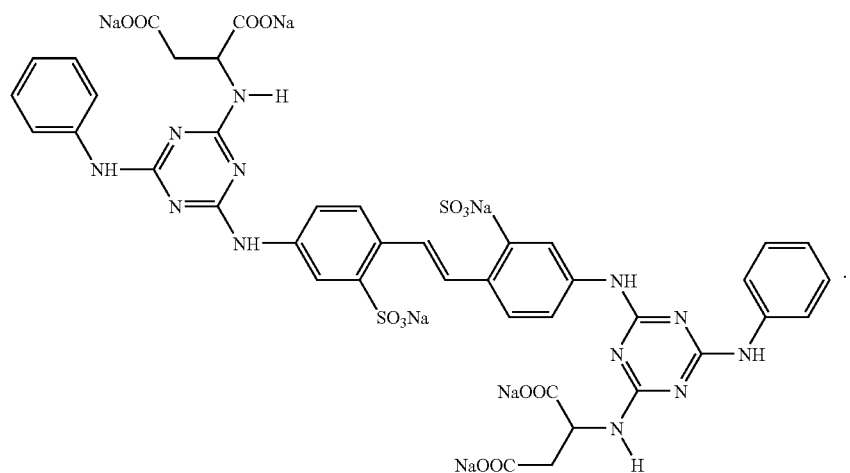

(F)

The fluorescent whitening agents are known and, for the most part, commercially available.

Another preferred group of anionic organic compounds comprises dyes that have at least one sulfonic acid group and/or carboxylic acid group and are selected from the following classes of dyes: metal-free or metal-containing mono-, dis- and poly-azo dyes, pyrazolone, thioxanthone, oxazine, stilbene, formazan, anthraquinone, nitro, methine, triphenylmethane, xanthone, naphthazarin, styryl, azastyryl, naphthoperinone, quinophthalone and phthalo-cyanine dyes.

Within that group, preference is given to azo dyes having at least one sulfo group, especially to the so-called azo direct dyes listed in the Colour Index, Third Edition, Volume 2 (The Society of Dyers and Colourists, 1971).

In addition to those azo dyes, preference is given also to phthalocyanine dyes that have at least one sulfo group.

An especially preferred group of azo dyes comprises those of formula

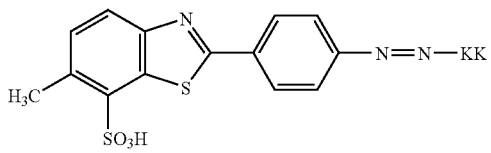

wherein KK is the radical of a coupling component.

Preference is given to coupling components of formula (H)

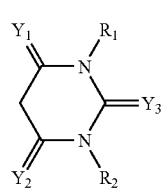

wherein
$Y_1$ and $Y_2$ are each independently of the other =O, =NH or =N—$C_1$-$C_4$alkyl,
$Y_3$ is =O, =S, =NR or =N—CN, R being hydrogen or $C_1$-$C_4$alkyl, and
$R_1$ and $R_2$ are each independently of the other hydrogen, unsubstituted or substituted alkyl or unsubstituted or substituted phenyl.

Especially preferred specific dyes are Direct Yellow 11, Direct Yellow 6 and Direct Orange 15.

The suitable dyes are likewise known and commercially available.

When the anionic organic compounds are intermediates, they are preferably aromatic sulfonic acids that still carry one or more further substituents from the series amino, nitro, alkyl and hydroxy.

Special preference is given to 2-amino-5-hydroxynaphthalene-7-sulfonic acid, 4-amino-toluene-2-sulfonic acid, dehydroparathiotoluidinesulfonic acid, 4,4'-diaminostilbene-2,2'-disulfonic acid, 4,4'-dinitrostilbene-2,2'-disulfonic acid, 4,4'-diamino-diphenylamine-2-sulfonic acid and 4-nitrotoluene-2-sulfonic acid.

An important advantage of the method according to the invention is that, before treatment, no additional salt is added to the synthesis solution or suspension for the purpose of precipitating the product. Therefore, only very small amounts of salt are present (<5%), which do not have to be separated out by means of further separation steps. The salts that are still present are mainly alkali metal halides, alkali metal sulfates or alkali metal hydrogen sulfates, especially NaCl, KCl, $Na_2SO_4$ and $NaHSO_4$.

Preference is given to starting from an aqueous synthesis solution or suspension having a salt content of less than 1.0% by weight, especially less than 0.5% by weight, based on the solution or suspension, which may still comprise starting materials and subsidiary products or other impurities in addition to the anionic organic compound.

Process technology distinguishes between the following pressure-driven membrane separation methods: filtration, microfiltration, ultrafiltration, nanofiltration and reverse osmosis, although the separation methods partly overlap in respect of the size of particles to be separated and process conditions such as the pressure to be applied.

Typically, the size of particles retained is from 0.1 to 10 μm or larger in microfiltration, from 0.01 to 0.1 μm and larger in ultrafiltration and from 0.001 to 0.01 μm or larger in nanofiltration. The retention is substantially governed by the pore size of the membranes used, the pressure conditions and the flow conditions. Accordingly, the pressure range is typically from 1 to 3 bar in microfiltration, from 2 to 10 bar in ultrafiltration and from 7 to 40 bar in nanofiltration. Such separation methods and their implementation in process technology are described in detail, for example, in the Hochschulkurs Membranprozesse (University Course in Membrane Processes), Part 1 and Part 2, of the Institut für Verfahrenstechnik of the RWRH Aachen, edited by Th. Melin, 2000.

Because, in the case of ultra- and nano-filtration, the pore size distribution can be determined only by laborious means and, in addition, the particle dimensions of the substances separated are generally not known, the molecular weight of the retained component is selected as the characteristic variable. Because ascertaining such a separation characteristic in its entirety is laborious, it is usually found to be sufficient, when characterising the membrane, to indicate the limit at which 90% or 95% of the molecules having a particular molecular weight are retained (molecular weight cut off, MWCO).

In accordance with the invention, the nanofiltration membranes and methods are so selected that the MWCO is, depending on the product, from 300 to 1000 Daltons, preferably from 300 to 800 Daltons and especially from 300 to 500 Daltons. For ultrafiltration, membranes, preferably ceramic membranes, are so selected that the pore size is in the range from 10 to 50 nm, especially 20 nm.

In the context of the present invention, all three membrane methods may be used, it being possible for different or identical modules to be connected in series.

Especially preferred methods are nanofiltration and ultrafiltration, especially nanofiltration.

True solutions are always present in the case of nanofiltration, whereas suspensions are present in the case of ultrafiltration and microfiltration.

The membranes used in ultra- and micro-filtration are exclusively pore membranes. Whether or not a particle is retained by the membrane, besides being dependent upon the operating conditions, is especially dependent upon the size and structure of the particle relative to the size and structure of the membrane pores; essentially, convective mass transfer takes place. A different limiting case is present in reverse osmosis, in which only diffusive transfer of the components passing over takes place. In that respect, nanofiltration is located between ultrafiltration and reverse osmosis.

Membranes suitable for all the methods are commercially available. They may comprise membranes made from organic polymers such as, for example, polystyrene, polyester, polyacrylonitrile, polypropylene, cellulose acetate or polyvinylidene fluoride. Those active membranes are usually mounted on a large-pore support layer.

Inorganic membranes are made from, for example, zirconium oxide, aluminium oxide or titanium oxide or mixtures thereof.

Preferably, there are used, for microfiltration and ultrafiltration, a ceramic membrane or an acid-resistant organic membrane and, for nanofiltration, an organic membrane.

The ultrafiltration and microfiltration method is preferably carried out in the acid range at a pH of <4.5 or in the highly alkaline range at a pH of >9.

The nanofiltration method is preferably carried out in the pH range from 5 to 11.

Microfiltration, ultrafiltration or nanofiltration is carried out preferably at from room temperature to about 95° C., especially from 30 to 85° C.

Nanofiltration is carried out especially at from 30 to 55° C.

Microfiltration, ultrafiltration or nanofiltration is carried out preferably at a pressure of from 2 to 40 bar.

Preferred pressure ranges for micro- and ultra-filtration are from 2 to 10 bar, especially from 2 to 5 bar. Nanofiltration is carried out at preferably from 7 to 40 bar, especially from 12 to 30 bar.

Optionally, when the product whose concentration is increased by micro- or ultra-filtration is present in the form of a suspension it may be converted into a liquid solution, which is carried out by adding suitable bases.

Bases suitable therefor are, for example, LiOH, $NH_4OH$ or an organic amine.

Suitable organic amines are, for example, a $C_4$-$C_{12}$trialkylamine, $C_4$-$C_{12}$diamine, $C_2$-$C_{15}$-alkanolamine or polyglycolamine.

Preference is given to the use of LiOH, $NH_4OH$ or an alkanolamine.

The dye or whitening agent solutions obtained may be used directly in that form or, where appropriate, after dilution. However, they may also be dried in conventional manner and used in the form of powder or granules.

The invention accordingly relates also to the solutions or suspensions of anionic organic compounds obtained in accordance with the method described hereinbefore and to the use thereof in dyeing or optically whitening paper or textiles or in the synthesis of anionic organic compounds.

The following Examples illustrate the Invention.

EXAMPLE 1

The compound of formula (E) is prepared in the manner described in U.S. Pat. No. 4,717,502 or in DD 55 668.

2 kg of the reaction mixture from the final reaction step (comprising about 13.5% of dissolved product by weight and also small amounts of NaCl (<5%) from the various synthesis steps), without first being salted out and after being diluted with 20% of deionised water by weight, are directly, in a nanofiltration, washed with 1.6 kg of deionised water and then concentrated to about 1.55 kg. A composite membrane from Nitto Denko, Type NTR-7450, is used. The total membrane surface area is about 190 $cm^2$, with a pressure of 23 bar being used. The cut-off is in the range from 400 to 500 g/mol. The permeate has a TOC value of 0.1%, of which 80% can be biologically degraded satisfactorily. It can be passed directly to the biological purification plant.

Comparison Test 1

2 kg of the reaction mixture which was sent directly for the increase in concentration mentioned in Example 1 are salted out using 0.25 kg of NaCl. The thick suspension is transferred to a suction filter and is washed with 0.42 litres of demineralised water. The waste water has a TOC value of 0.9%, of which 10% are biologically degradable and 90% are refractory. The waste water must be subjected to special treatment before it can be passed to the biological purification plant.

What is claimed is:

1. A method of reducing the total organic carbon (TOC) content of waste water in the course of the preparation of concentrated solutions or suspensions of anionic organic compounds, which method comprises increasing the concentration of an aqueous solution or suspension of an anionic organic compound in the form of its free acid or its alkali metal salt, having a salt content of less than 5% of extraneous salt by weight based on the total solution or suspension, by nanofiltration,
   a) the membrane pore size being so selected that compounds having molecular weights in the range from 300 to 1000 Daltons or higher are retained, and
   b) the content of anionic compound in the concentrate being so adjusted to from 10 to 50% by weight so that the total organic carbon (TOC) content of the permeate is less than 0.5% by weight, based on the total permeate, and
   c) optionally, after increasing the concentration of a suspension, dissolving the anionic organic compound by adding a suitable base.

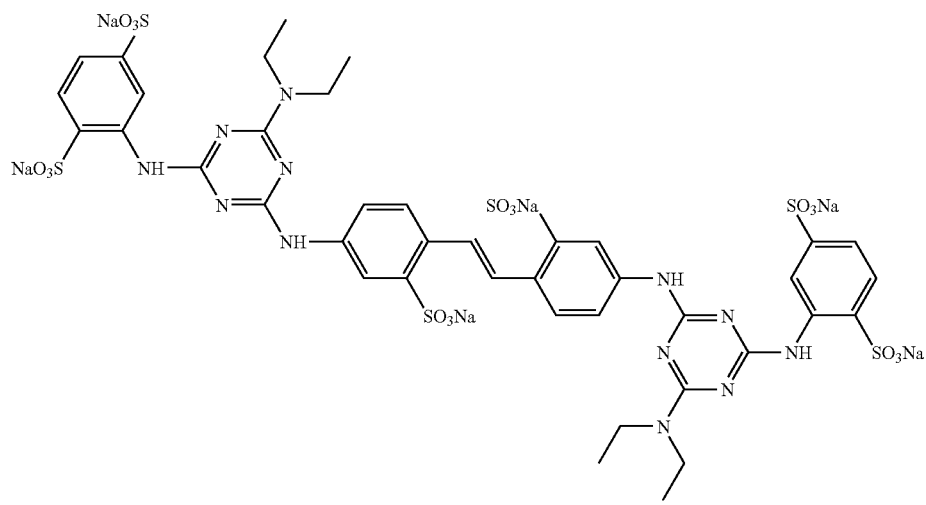

(E)

2. A method according to claim 1, wherein the anionic organic compound used is a fluorescent whitening agent, a dye or an intermediate for the preparation thereof.

3. A method according to claim 2, wherein a sulfo— and/or carboxy-group-containing fluorescent whitening agent from one of the following classes is used: bis-triazinylamino-stilbenes, bis-triazolyl-stilbenes, bis-styryl-biphenyls or bis-benzofuranylbiphenyls, bis-benzoxalyl derivatives, bis-benzimidazolyl derivatives, coumarin derivatives or pyrazoline derivatives.

4. A method according to claim 3, wherein the fluorescent whitening agent contains at least 2 sulfo groups.

5. A method according to claim 2, wherein a fluorescent whitening agent of formula 1, 2, 3, 4 or 5 is used

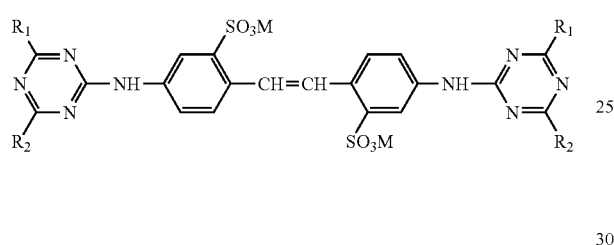
(1)

wherein $R_1$ and $R_2$ are each independently of the other —OH, —Cl, —NH$_2$, —O—C$_1$-C$_4$ alkyl, —O—aryl, —NH—C$_1$-C$_4$alkyl, —N(C$_1$-C$_4$alkyl)$_2$, —N(C$_1$-C$_4$ alkyl)(C$_1$-C$_4$hydroxyalkyl), —N(C$_1$-C$_4$hydroxyalkyl)$_2$, —NH—aryl, morpholino or S—C$_1$-C$_4$alkyl(aryl), and aryl is phenyl or naphthyl, each of which may be substituted by 1 or 2 sulfo groups;

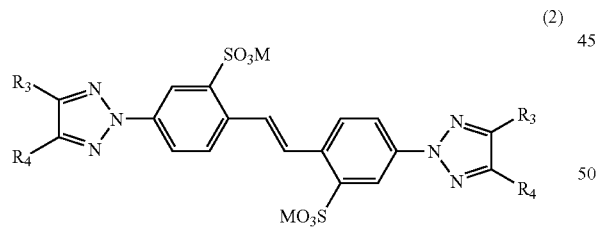
(2)

wherein $R_3$ and $R_4$ are each independently of the other hydrogen, C$_1$-C$_4$ alkyl, phenyl or a radical of formula

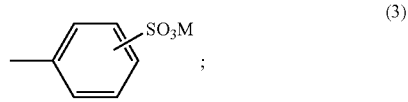
(3)

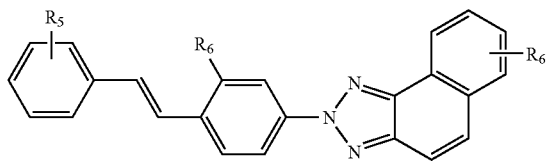

wherein $R_5$ is hydrogen, Cl or SO$_3$M; and $R_6$ is —CN, —SO$_3$M, —S(C$_1$-C$_4$alkyl) or —S(aryl);

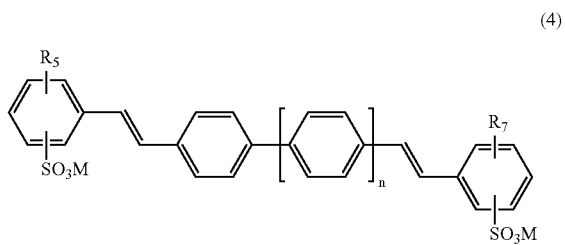
(4)

wherein $R_7$ is hydrogen, —SO$_3$M, —O—C$_1$-C$_4$alkyl, —CN, —Cl, —COO—C$_1$-C$_4$alkyl or CON (C$_1$-C$_4$alkyl)$_2$;

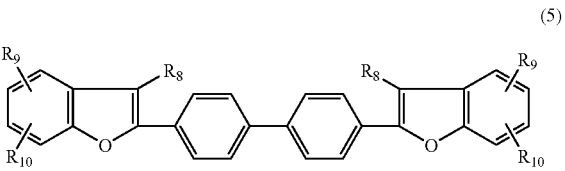
(5)

wherein $R_8$ is hydrogen, —C$_1$-C$_4$alkyl, —Cl or —SO$_3$M; and $R_9$ and $R_{10}$ are each independently of the other hydrogen, C$_1$-C$_4$alkyl, —SO$_3$M, —Cl or —O—C$_1$-C$_4$alkyl;

M is hydrogen, an alkali metal or an ammonium cation, and n is a number 1, 2 or 3.

6. A method according to claim 5, wherein there is used a fluorescent whitening agent

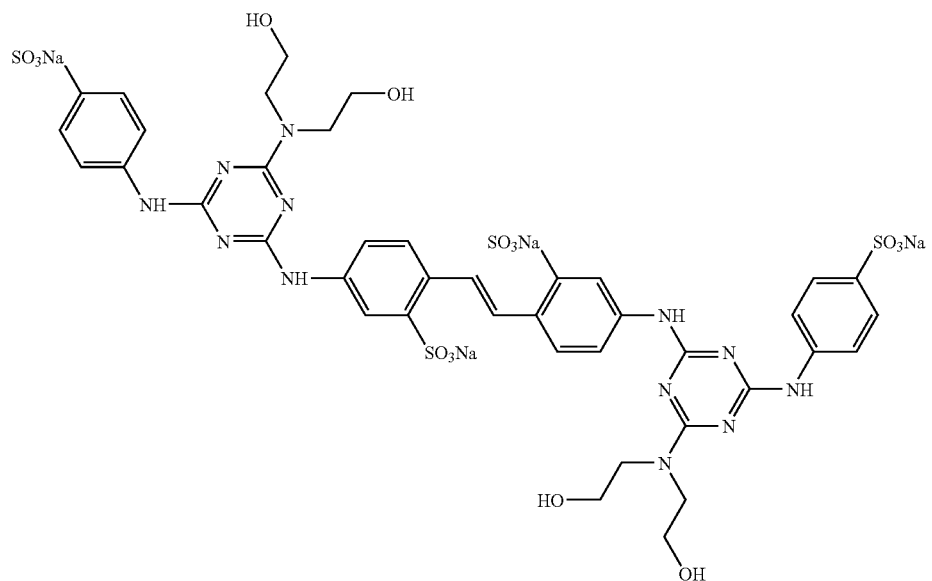
(A)
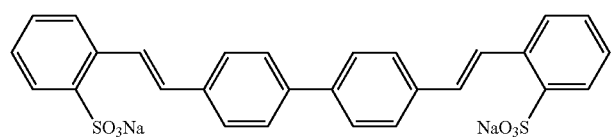
(B)
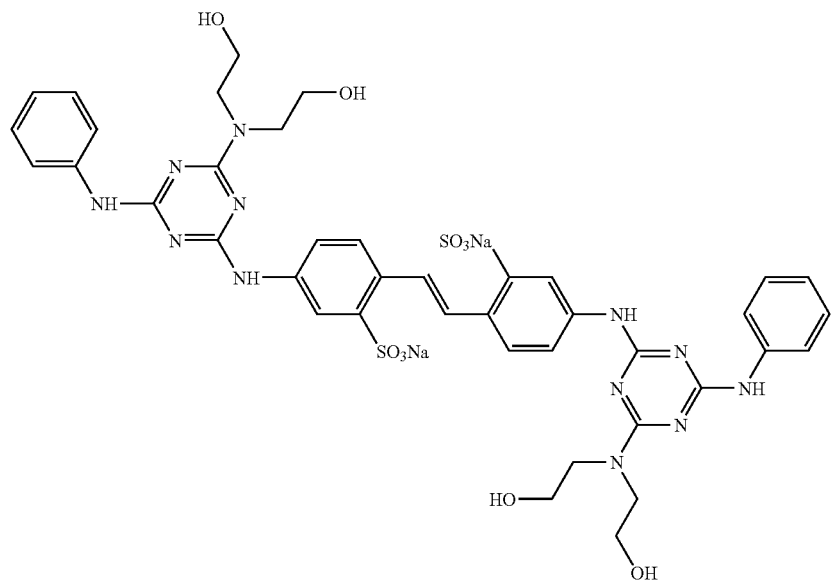
(C)

-continued

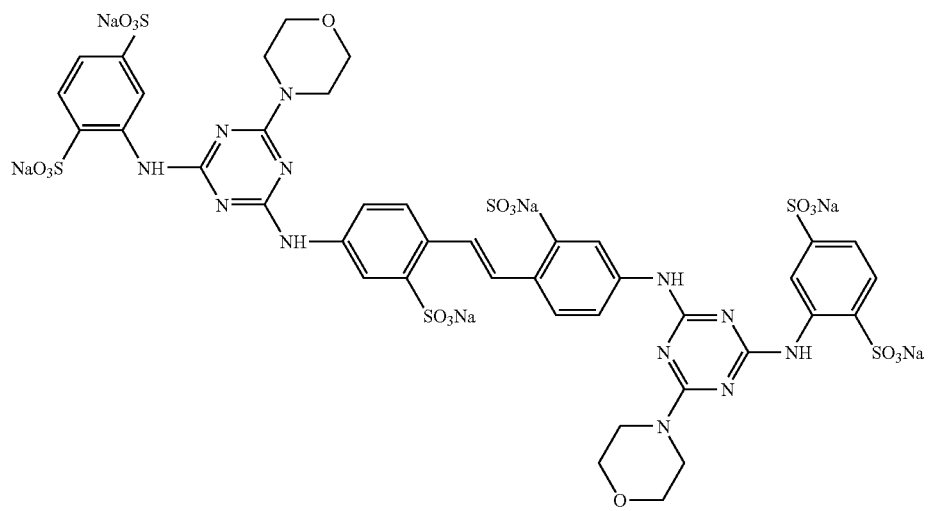

(D)

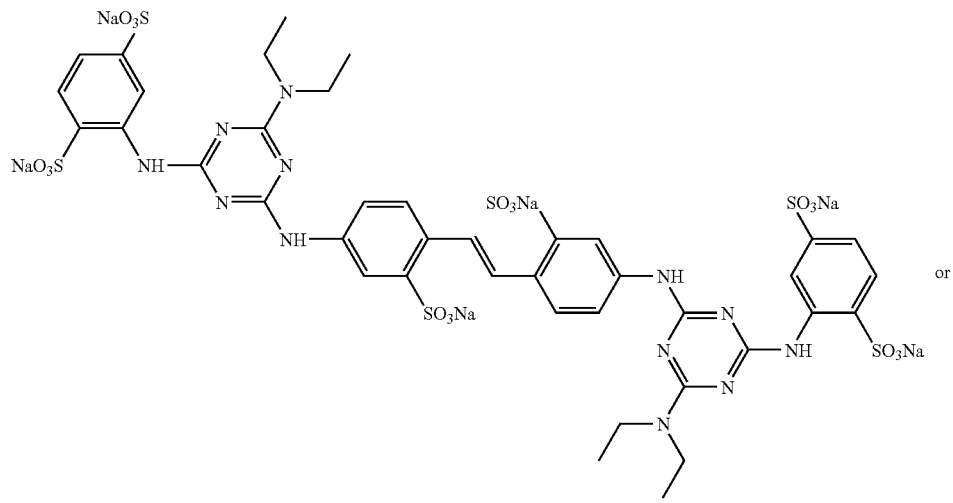

(E)

or

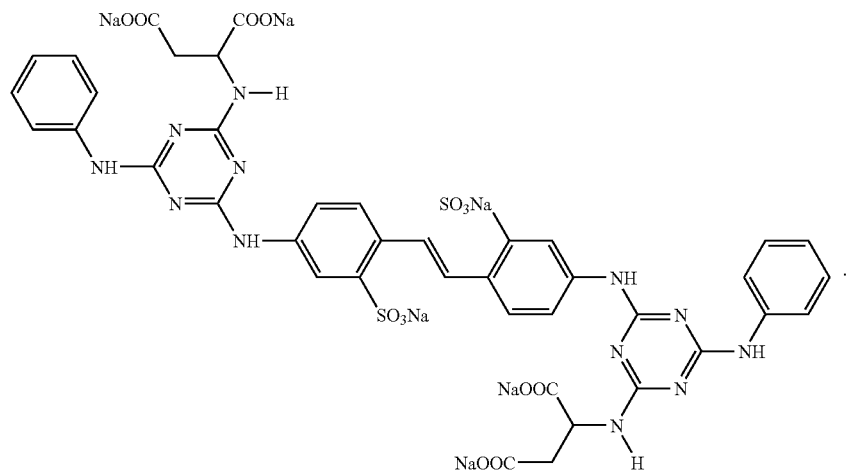

(F)

7. A method according to claim 2, wherein there is used a dye having at least one sulfonic acid group and/or carboxylic acid group from the following classes of dyes: metal-free or metal-containing mono-, dis- and poly-azo dyes, pyrazolone, thioxanthone, oxazine, stilbene, formazan, anthraquinone, nitro, methine, triphenylmethane, xanthone, naphthazarin, styryl, azastyryl, naphthoperinone, quinophthalone and phthalocyanine dyes.

8. A method according to claim 7, wherein there is used an azo dye having at least one sulfo group.

9. A method according to claim 8, wherein there is used a dye of formula

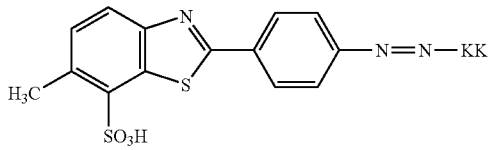

(G)

wherein KK is the radical of a coupling component.

10. A method according to claim 9, wherein there is used a dye of formula (G) wherein KK is a coupling component of formula

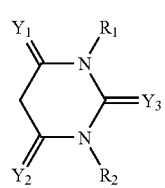

(H)

wherein
$Y_1$ and $Y_2$ are each independently of the other =O, =NH or =N—$C_1$-$C_4$ alkyl,
$Y_3$ is =O, =S, =NR or =N—CN, R being hydrogen or $C_1$-$C_4$alkyl, and
$R_1$ and $R_2$ are each independently of the other hydrogen, unsubstituted or substituted alkyl or unsubstituted or substituted phenyl.

11. A method according to claim 7, wherein the dye Direct Yellow 11, Direct Yellow 6 or Direct Orange 15 is used.

12. A method according to claim 2, wherein there is used, as anionic intermediate, an aromatic sulfonic acid that still carries one or more further substituents selected from the group consisting of amino, nitro, alkyl and hydroxy.

13. A method according to claim 12, wherein there is used 2-amino-5-hydroxynaphthalene-7-sulfonic acid, 4-aminotoluene-2-sulfonic acid, dehydroparathiotoluidinesulfonic acid, 4,4'-diaminostilbene-2,2'-disulfonic acid, 4,4'-dinitrostilbene-2,2'-disulfonic acid, 4,4'-diamino-diphenylamine-2-sulfonic acid or 4-nitrotoluene-2-sulfonic acid.

14. A method according to claim 1, which comprises starting from an aqueous synthesis solution or suspension having a salt content of less than 1.0% by weight, based on the solution or suspension.

15. A method according to claim 1, which comprises using an organic membrane for nanofiltration.

16. A method according to claim 1, wherein the nanofiltration is carried out at from room temperature to about 95° C.

17. A method according to claim 1, wherein the nanofiltration is carried out at a pressure of from 2 to 40 bar.

18. A method according to claim 1, wherein after nanofiltration, LiOH, $NH_4OH$ or an organic amine is added to the suspension obtained.

19. A method according to claim 18, wherein as organic amine there is used a $C_4$-$C_{12}$-trialkylamine, $C_4$-$C_{12}$diamine, $C_2$-$C_{15}$alkanolamine or polyglycolamine.

* * * * *